United States Patent
Moorman et al.

(12) 
(10) Patent No.: US 6,585,617 B1
(45) Date of Patent: Jul. 1, 2003

(54) ELECTRO-HYDRAULIC CONTROL SYSTEM FOR A MULTI-SPEED POWER TRANSMISSION

(75) Inventors: Steven Patrick Moorman, Dexter, MI (US); Charles Francis Long, Pittsboro, IN (US)

(73) Assignee: General Motors Corporation, Detroit, MI (US)

(*) Notice: Subject to any disclaimer, the term of this patent is extended or adjusted under 35 U.S.C. 154(b) by 7 days.

(21) Appl. No.: 10/025,232

(22) Filed: Dec. 19, 2001

(51) Int. Cl.[7] .......................... F16H 31/00; F16H 61/00
(52) U.S. Cl. ...................... 475/119; 475/120; 475/123; 477/906
(58) Field of Search .................. 475/116, 118, 475/119, 120, 121, 122, 123; 477/906

(56) References Cited

U.S. PATENT DOCUMENTS

| | | | |
|---|---|---|---|
| 5,601,506 A | * 2/1997 | Long et al. | 475/120 |
| 5,616,093 A | * 4/1997 | Long et al. | 475/120 |
| 5,681,241 A | * 10/1997 | Kubo et al. | 477/906 X |
| 6,077,182 A | * 6/2000 | Long et al. | 477/906 X |
| 6,394,926 B1 | * 5/2002 | Jang | 475/116 |
| 6,520,881 B1 | * 2/2003 | Long et al. | 475/119 |

FOREIGN PATENT DOCUMENTS

| | | | | |
|---|---|---|---|---|
| JP | 363270954 | * | 11/1988 | 475/116 |
| JP | 402209662 | * | 8/1990 | 475/123 |

* cited by examiner

Primary Examiner—Charles A Marmor
Assistant Examiner—Ha Ho
(74) Attorney, Agent, or Firm—Leslie C. Hodges

(57) ABSTRACT

A powertrain has an electro-hydraulic control mechanism that provides for the establishment of six forward speeds, a neutral condition and a reverse speed. The control system also permits operation in the fifth forward range if electrical power is discontinued when the transmission is operating in the third range or higher, and permits operation in the third range if the transmission is operating in the second range or lower when an electrical power discontinuance occurs. If an electric disconnect occurs, the reverse drive is available, neutral is available, and third forward drive is available from the reverse and neutral conditions. The drive-home functions described are provided through the use of a multiplex valve, default valve and a pair of solenoid valves. The multiplex valve and default valve also permit the controlling of two mutually exclusive torque transmitting devices through the use of a single trim valve.

5 Claims, 8 Drawing Sheets

ELECTRO-HYDRAULIC CONTROL SYSTEM FOR A MULTI-SPEED POWER TRANSMISSION

TECHNICAL FIELD

The present invention is related to transmission control mechanisms and, more particularly, to electro-hydraulic control mechanisms for multi-speed transmissions.

BACKGROUND OF THE INVENTION

Multi-speed power transmissions, particularly those using planetary gear arrangements, require a hydraulic system to provide controlled engagement and disengagement, on a desired schedule, of the clutches and brakes which operate to establish the ratios within the planetary gear arrangement.

These control systems have evolved from substantially pure hydraulic control systems, wherein all of the control signals are produced by hydraulic devices, to electro-hydraulic control systems, wherein a number of the control signals are produced by an electronic control unit which emits electrical control signals to solenoid valves which then issue controlled hydraulic signals to the various operating valves within the transmission control.

With many of the early pure hydraulic and first generation electro-hydraulic control systems, the power transmission utilized a number of freewheel or one-way devices which smooth the shifting or ratio interchange of the transmission during both upshifting and downshifting of the transmission. This relieved the hydraulic control system from providing for the control of overlapping between the friction device that was coming on and the friction device that was going off. If this overlap is too much, the driver feels a shudder in the drivetrain, and if the overlap is too little, the driver experiences engine flare or a sense of coasting. The freewheel device prevents this feeling that, as is well known, the freewheel one-way devices will quickly engage when the torque imposed thereon is reversed from a freewheeling state to a transmitting state.

The advent of electro-hydraulic devices gave rise to what is known as clutch-to-clutch shift arrangements to reduce the complexity of the transmission and the control. These electro-hydraulic control mechanisms are generally perceived to reduce cost and reduce the space required for the control mechanism.

Also, with the advent of more sophisticated control mechanisms, the power transmissions have advanced from two-speed or three-speed transmissions to five-speed and six-speed transmissions. In at least one presently available six-speed transmission, just five friction devices are employed to provide six forward speeds and neutral condition and a reverse speed. Such a gear arrangement is shown in U.S. Pat. No. 4,070,927 issued to Polak on Jan. 31, 1978.

The use of the planetary gearset shown in the Polak patent has given rise to a number of electro-hydraulic control mechanisms, such as that shown in U.S. Pat. No. 5,601,506, issued to Long et al. on Feb. 11, 1997. This control utilizes a solenoid trim pressure system that is limited in flexibility in that the transmission control can only provide single step speed ratio interchanges. Two other electro-hydraulic control mechanisms shown in U.S. Pat. Nos. 4,827,806 and 5,616,093, both issued to the assignee of this application, provide drive-home capabilities within the transmission in the event that the electronic system undergoes a malfunction or discontinuance of operation.

The drive-home feature of a power transmission is an important factor in that it permits the vehicle operator to return home with the vehicle so that the proper repairs can be undertaken at a repair station rather than in the field where the vehicle underwent the malfunction.

SUMMARY OF THE INVENTION

It is an object of this invention to provide an improved electro-hydraulic control mechanism for a multi-speed power transmission.

In one aspect of the present invention, an electro-hydraulic control mechanism permits improved operation of the transmission in the event of an electrical malfunction. In another aspect of the present invention, the improved electro-hydraulic control permits the operator to select a reverse drive, a neutral condition, and a forward drive in the event of an electrical power cessation. In yet another aspect of the present invention, the improved electro-hydraulic control will default to a forward high-speed range in the event of an electrical power discontinuance when the transmission is operating at or above a predetermined high-speed range.

In yet a further aspect of the present invention, the improved electro-hydraulic control will permit the selection of a lower forward speed range, following a manual shift from reverse to forward, during discontinuance of electrical power in the high speed operation. In yet still another aspect of the present invention, the improved electro-hydraulic control mechanism will permit operation in a lower speed range in the event that a malfunction occurs below the above-mentioned predetermined speed range.

In yet a further aspect of the present invention, the improved electro-hydraulic control mechanism includes a default valve, a multiplex valve, a manual valve, and a single on/off solenoid control to establish the forward/neutral/reverse operation if an electrical shutdown occurs. In yet an even further aspect of the present invention, the multiplex valve of the improved electro-hydraulic control mechanism prevents simultaneous engagement of mutually exclusive torque transmitting devices or friction devices.

BRIEF DESCRIPTION OF THE DRAWINGS

FIG. 5 is a schematic representation similar to FIG. 2, depicting the control mechanism in forward second gear operation with electrical power ON.

FIG. 7 is a schematic representation depicting the control system the control system in the sixth forward range with the electrical power ON.

DESCRIPTION OF THE PREFERRED EMBODIMENT

Figure 1:
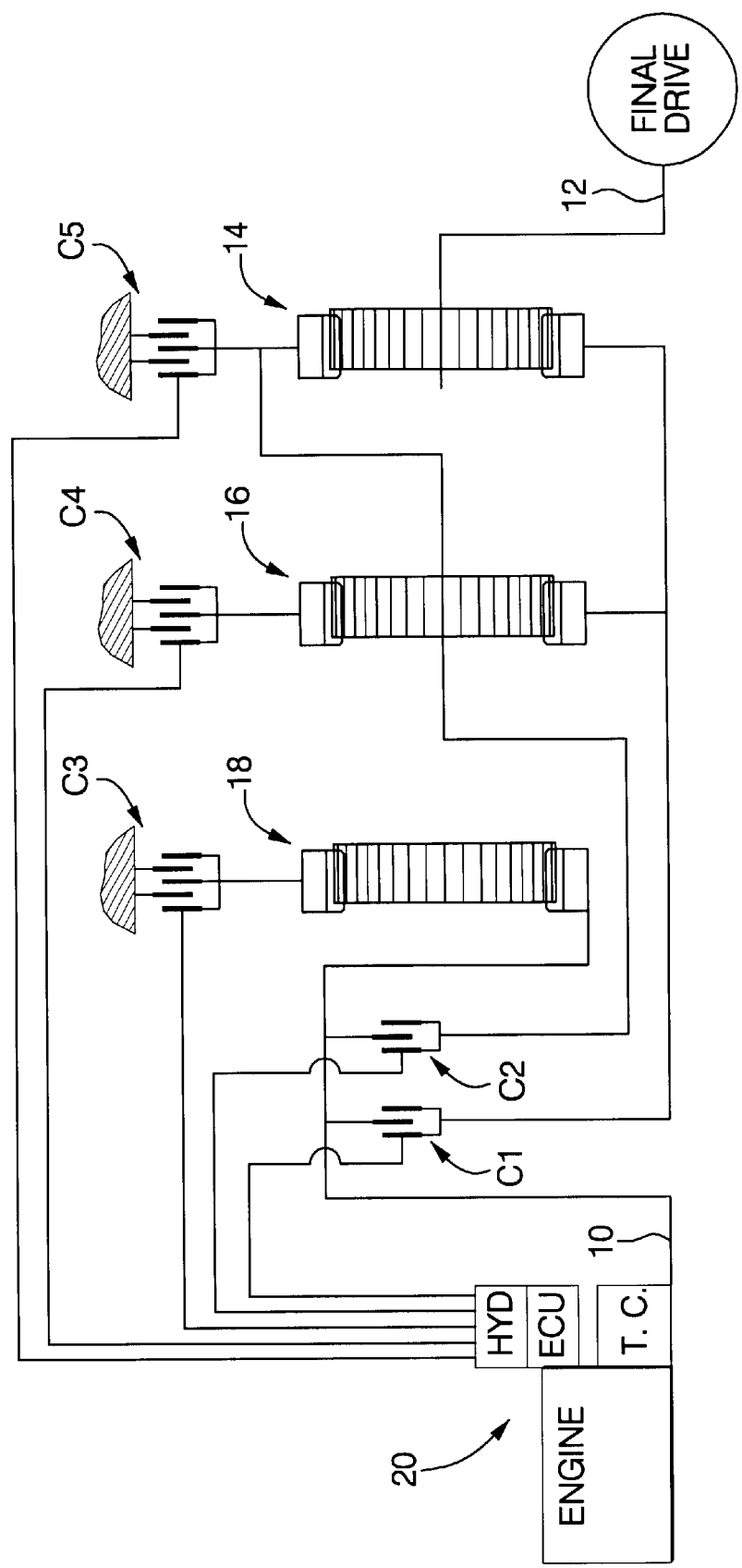
FIG. 1 is a schematic representation of a powertrain equipped to utilize the present invention.
Figure 2:
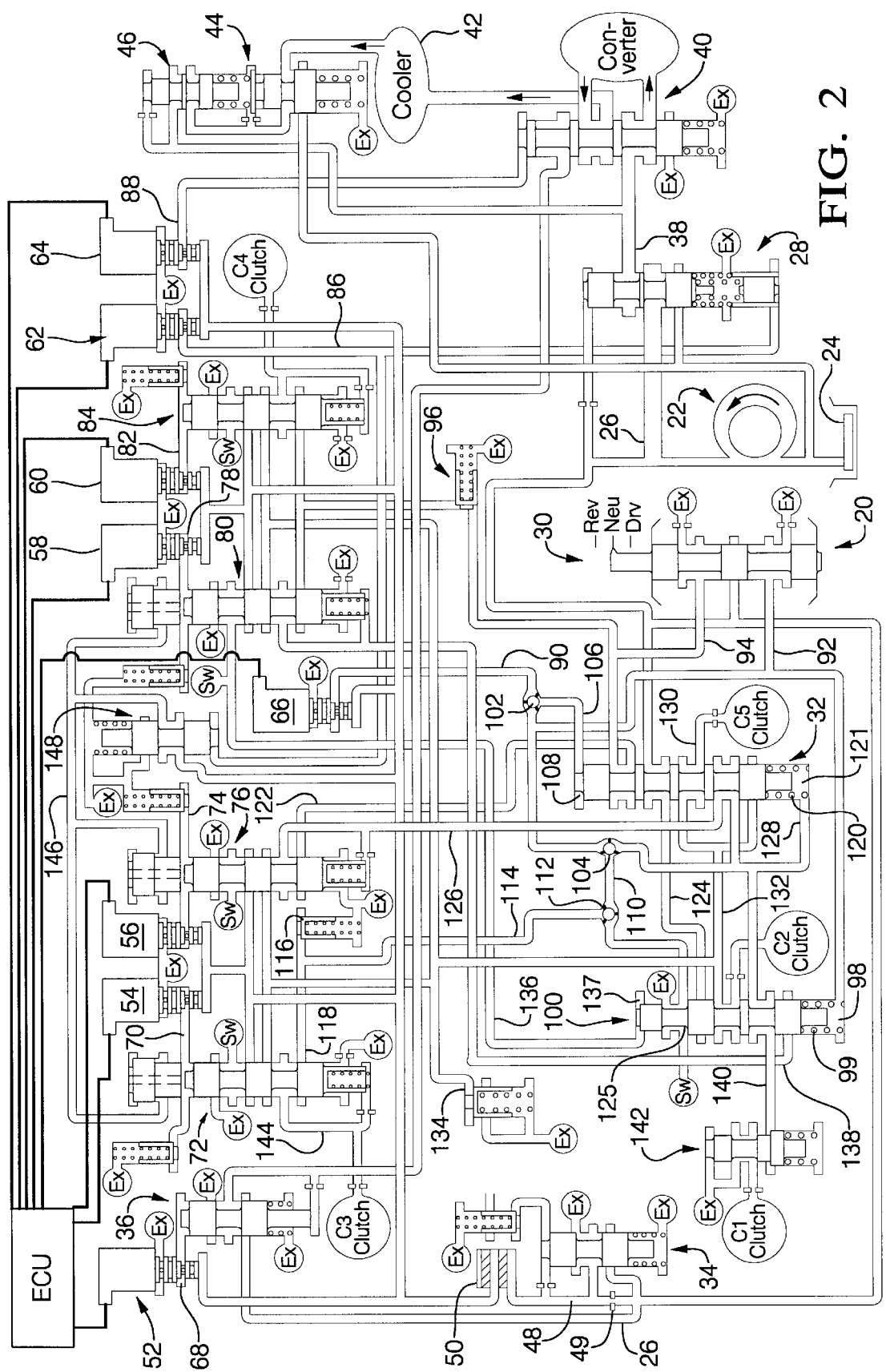
FIG. 2 is a schematic representation describing the electro-hydraulic control system utilized with the powertrain of FIG. 1, depicting the control system in an electrical power ON neutral condition.

Referring to the drawings, wherein like characters represent the same or corresponding parts throughout the several views, there is seen in FIG. 1 a powertrain having an engine, a torque converter (TC), a planetary gear arrangement, and a conventional final drive.

The planetary gear arrangement includes an input shaft 10, an output shaft 12, three planetary gearsets 14, 16 and 18, and five torque transmitting devices C1, C2, C3, C4 and C5, and an electro-hydraulic control mechanism 20. The torque transmitting devices C1 and C2 are conventional fluid-operated rotating clutch-type devices, while the torque transmitting devices C3, C4 and C5 are conventional fluid-operated stationary clutch or brake devices. The selective engagement and disengagement of the torque transmitting devices is controlled by the electro-hydraulic control mechanism 20, which is shown in FIGS. 2 through 8.

The powertrain shown in FIG. 1 is substantially the same as that shown in U.S. Pat. No. 4,070,927, issued to Polak, Jan. 31, 1978. The planetary gear arrangement shown therein provides six forward speed ratios and one reverse ratio between the input shaft 10 and the output shaft 12. During the first forward speed ratio, the torque transmitting devices C1 and C5 are engaged. During the second forward speed ratio, the torque transmitting devices C1 and C4 are engaged. During the third forward speed ratio, the torque transmitting devices C1 and C3 are engaged. During the fourth forward speed ratio, the torque transmitting devices C1 and C2 are engaged. During the fifth forward speed ratio, the torque transmitting devices C2 and C3 are engaged. During the sixth forward speed ratio, the torque transmitting devices C2 and C4 are engaged. During the reverse drive ratio, the torque transmitting devices C5 and C3 are engaged. The gearing also provides a neutral condition when the torque-transmitting device C5 is engaged and the remaining torque transmitting devices are disengaged. Also during neutral, the torque-transmitting device C5 may be disengaged. A more complete description of the planetary gear arrangement and its operation can be found the above-identified Polak patent.

The electro-hydraulic control mechanism 20 includes an electronic control unit (ECU) and a hydraulic control unit (HYD). The ECU incorporates a conventional digital computer that is programmable to provide electrical signals to the hydraulic portion of the control to establish the engagement and disengagement of the torque transmitting devices. The hydraulic portion of the electro-hydraulic control mechanism 20 includes a conventional hydraulic pump 22 that draws fluid from a reservoir 24 for delivery to a main passage 26. The main passage 26 is in communication with a conventional main regulator valve 28, a manual valve 30, a multiplex valve 32, a control pressure regulator valve 34 and a torque converter clutch valve 36.

The main regulator valve 28 establishes the system pressure in the passage 26 and when that pressure is satisfied, fluid is delivered through a passage 38 to a converter flow valve 40. The converter flow valve 40 distributes fluid to and from the torque converter (TC). The fluid returning from the torque converter (TC) passes through a conventional cooler 42 and a lube regulator valve 44 for distribution to the lubrication system of the transmission. The pressure in passage 38 is limited to a maximum value by a converter relief valve 46.

The control pressure regulator valve 34 reduces the pressure in passage 26 to a control pressure in passage 48, after the fluid passes through a restriction 49. The fluid in passage 48 is distributed through a conventional filter 50 to a plurality of conventional solenoid valves 52, 54, 56, 58, 60, 62, 64 and 66. The solenoid valves 64 and 66 are on/off type solenoid valves while the solenoid valves 52, 54, 56, 58, 60 and 62 are variable pressure-type solenoid valves. The solenoid valves 54, 56 and 62 are normally open-type solenoid valves while the remaining solenoid valves are normally closed-type solenoid valves. As is well known, a normally open solenoid valve will distribute output pressure when no electrical signal is available at the solenoid coil.

The solenoid valve 52 has an output passage 68 that controls a bias pressure on the torque converter clutch valve 36. The solenoid valve 54 has an output pressure in passage 70 that controls the bias pressure or control pressure on a trim valve 72. The solenoid valve 56 has an output passage 74 that controls the pressure bias on a trim valve 76. The solenoid valve 58 has an output passage 78 that controls the pressure bias on a trim valve 80. The solenoid valve 60 has an output passage 82 that controls the pressure bias on a trim valve 84. The solenoid valve 62 has an output passage 86 that controls a bias pressure on the main regulator valve 28. The solenoid valve 64 has an output passage 88 that controls a bias pressure on the torque converter flow valve 40. The solenoid valve 66 has an output passage 90 that controls a bias pressure on the multiplex valve 32.

The manual valve 30 has a reverse position wherein the main passage 26 is communicated with a reverse passage 92, and a drive position or forward in which the fluid pressure in the main passage 26 is communicated with a forward passage 94. The forward passage 94 communicates with the multiplex valve 32, an accumulator 96 and the trim valves 80 and 84. A default valve 100 includes a bias spring 99 disposed in a spring chamber 98. The reverse passage 92 communicates with a spring chamber 98 and a pair of shuttle valves 102 and 104. The shuttle valves 102 and 104 are conventional shuttle type valves that pass the highest pressure through the valve to an outlet passage. The outlet passage for the shuttle valve 102 is a passage 106 that is connected with a control chamber 108 and the multiplex valve 32. An outlet passage 110 of the shuttle valve 104 is an inlet passage for a shuttle valve 112 that has an outlet passage 114 that communicates with an accumulator 116 and an inlet passage 118 for the trim valve 72. Fluid pressure in the spring chamber 98 assures that the default valve 100 will remain in the spring set position.

Figure 3:
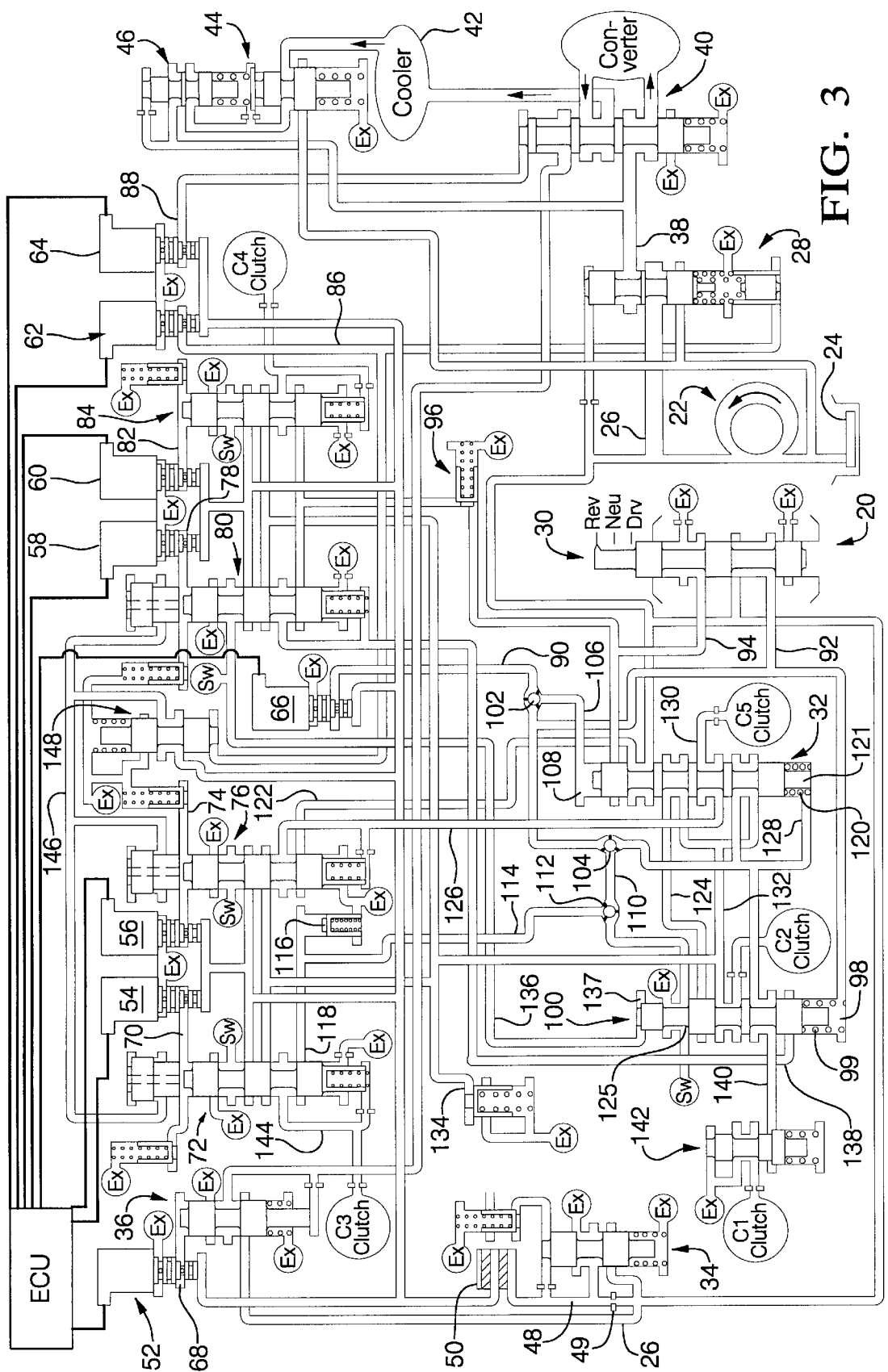
FIG. 3 is a schematic representation similar to FIG. 2, depicting the control mechanism in reverse and a power ON condition.
Figure 4:
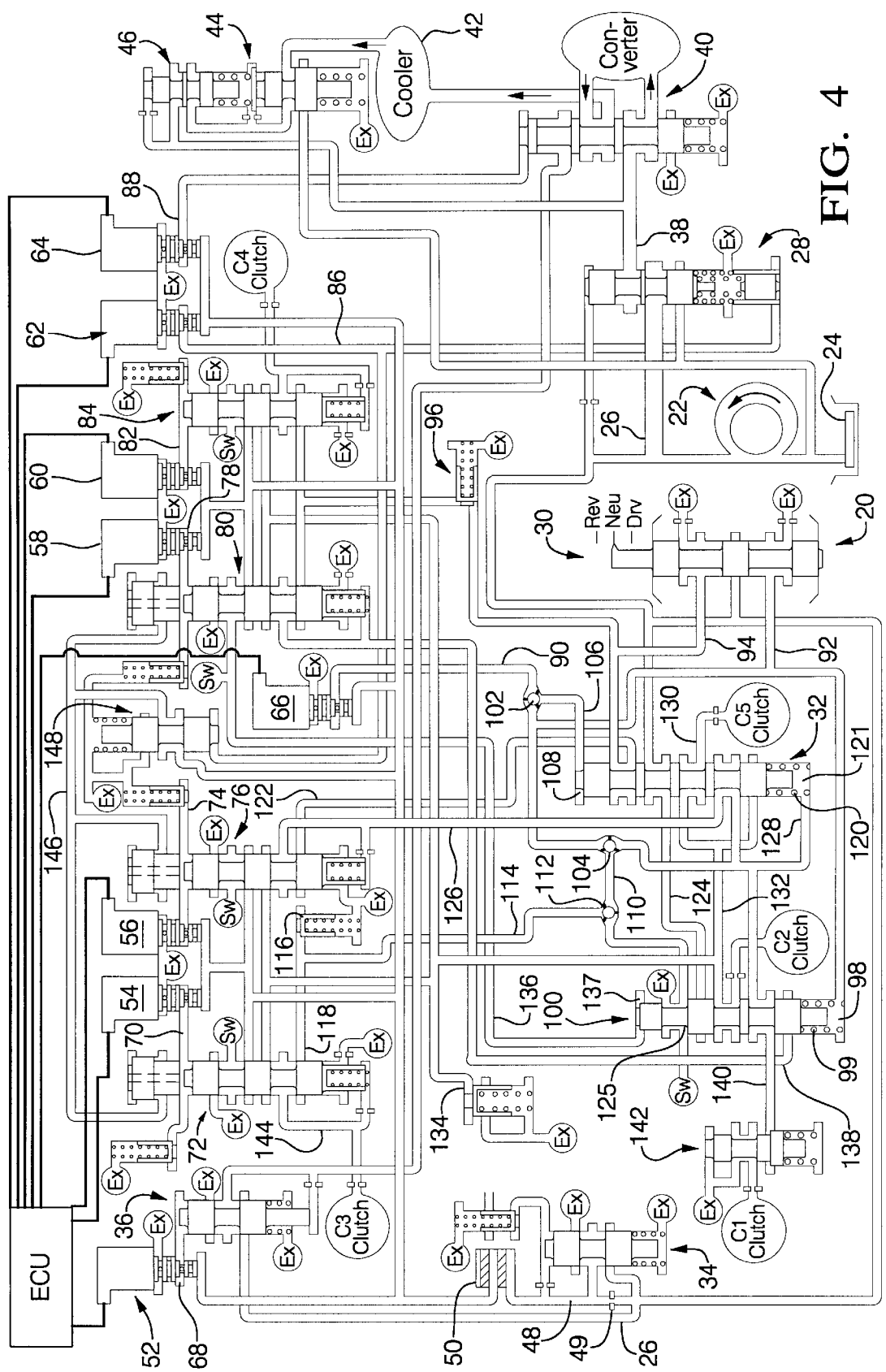
FIG. 4 is similar to FIG. 2, depicting the transmission in a neutral condition with the power OFF.
Figure 5:
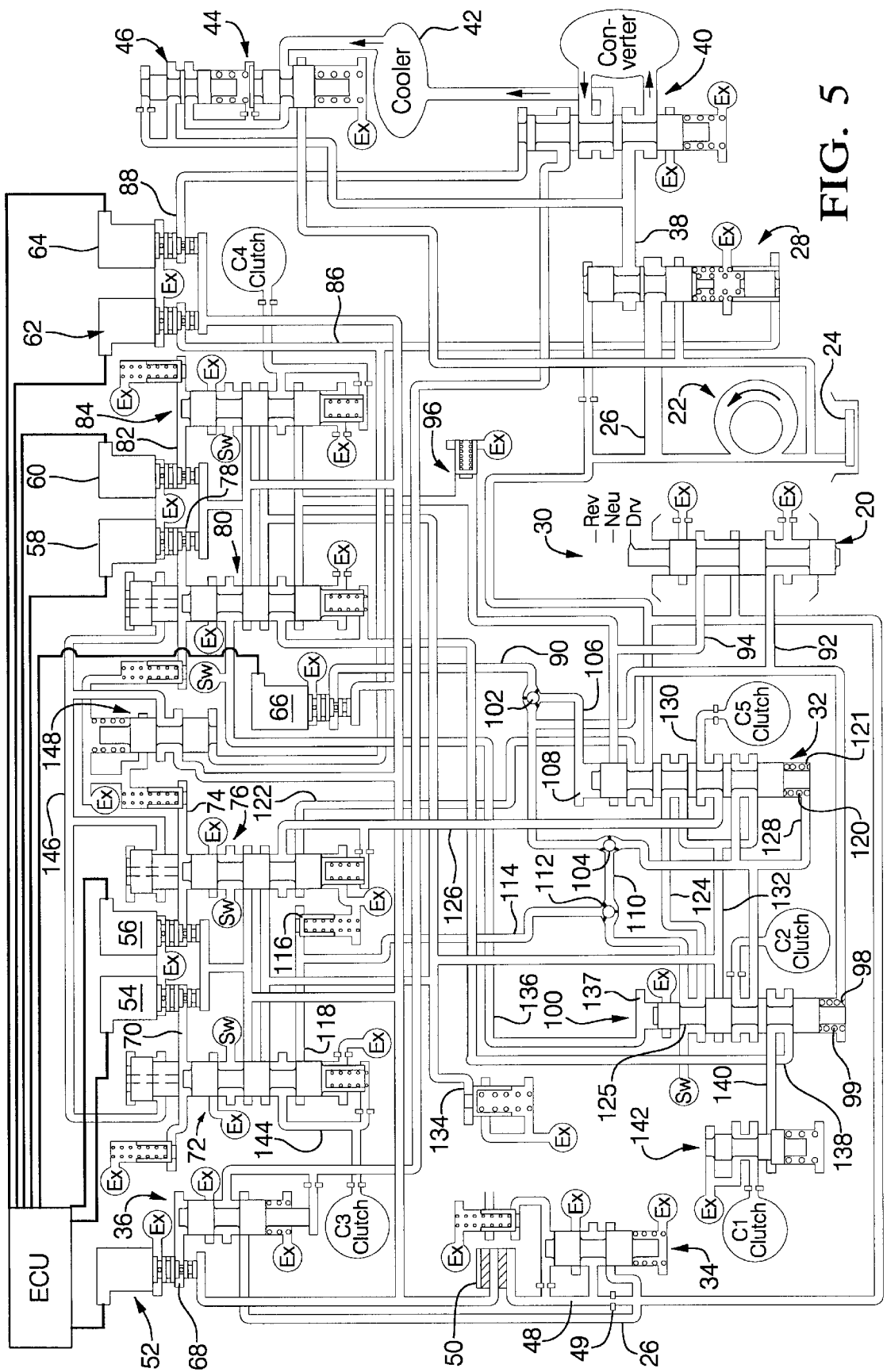

The multiplex valve 32 has a spring set position shown in FIGS. 2, 4, 6, 7 and 8 and a pressure set position shown in FIGS. 3 and 5. In the pressure set position, fluid pressure in chamber 108 forces the multiplex valve 32 against a bias spring 120 disposed in a spring chamber 121. In the spring set position, the multiplex valve 32 connects fluid in passage 94 with a passage 122 that is an inlet passage for the trim valve 76. Also, in the spring set position shown, the multiplex valve 32 communicates pressure in the main passage 26 with a passage 124 that communicates with differential bias area 125 formed on the default valve 100. Further, in the spring set position, the multiplex valve 32 communicates fluid pressure in a passage 126 with a passage 128 that communicates with the default valve 100, the spring chamber 121 and the shuttle valve 104. The passage 126 is the outlet passage of the trim valve 76. Fluid pressure in the spring chamber 121 assures that the multiplex valve 32 will remain in the spring set position regardless of the fluid pressure in the chamber 108.

The multiplex valve 32 communicates with a passage 130 that is connected with the torque-transmitting device C5.

The passage 130 is communicated with a backfill passage 132 which communicates with a backfill check valve 134 which ensures that the pressure in passage 132 is maintained at a fixed pressure generally 2 psi. The backfill passage 132 communicates with the trim valves 72, 76, 80 and 84.

The default valve 100 communicates with the torque-transmitting device C2. In the spring set position shown, the torque-transmitting device C2 communicates to the default valve 100 with the backfill passage 132 and is therefore exhausted. The default valve 100 is placed in the pressure set position by fluid pressure in a passage 136 acting in a chamber 137. The passage 136 is supplied with fluid from the trim valve 80. When the spring chamber 98 is pressurized, the default valve will remain in the spring set position regardless of the pressure in the chamber 137 or at the differential bias area 125.

The torque transmitting device C2 communicates with either the passage 128 or the passage 132 through the default valve 100. Thus, the torque transmitting device C2 is either communicated with the backfill passage 132 or passage 128. The engagement and disengagement of the torque transmitting device C2, as well as the torque-transmitting device C5, is controlled by the outlet pressure of the trim valve 76, which is communicated through passage 126.

The default valve 100 also communicates with a passage 138, which is the outlet passage of the trim valve 80, and with a passage 140 which communicates with an exhaust check valve 142 that communicates with the C1 torque-transmitting device. The exhaust check valve 142 controls the pressure in the torque transmitting device C1 to an exhaust pressure when it is disengaged and to an engagement pressure in passage 140 when it is desired to engage the torque transmitting device C1. The torque transmitting device C1 can be engaged by pressure from the trim valve 80 when the default valve 100 is in the pressure set position and by pressure from the trim valve 76 when both the default valve 100 and the multiplex valve 32 are in the spring set position.

The trim valve 72 controls the pressure distribution to the torque-transmitting device C3 through an outlet passage 144. When the solenoid valve 54 is operated, a control pressure acting on the top of the trim valve 72 will permit the pressure in passage 144 to be controlled to establish engagement of the torque-transmitting device C3.

The trim valve 76 controls the engagement pressure for the torque transmitting devices C2 and C5. The trim valve 80 controls the engagement pressure for the torque-transmitting device C1. The trim valve 84 controls the engagement pressure for the torque-transmitting device C4. Since C5 and C2 are mutually exclusive, that is they cannot be engaged simultaneously without causing interruption in transmission operation, the multiplex valve 32 and default valve 100 cooperate to ensure that these two devices will not be engaged simultaneously. The position of the multiplex valve 32 is controlled by the solenoid valve 66. When the solenoid valve 66 is energized, the multiplex valve 32 assumes the pressure set position and when de-energized, the multiplex valve 32 is placed in the spring set position.

The positioning of the default valve 100 is controlled in the spring set position by the spring 99 and in the pressure set position by pressure in passage 136 which is a control pressure distributed from the trim valve 80. Whenever the solenoid valve 58 is operated to control the pressure in the torque-transmitting device C1, the passage 136 will be energized to place the default valve 100 in the pressure set position. When the default valve 100 is in the pressure set position, the torque-transmitting device C2 is communicated with the passage 128. If the solenoid valve 66 is ON, the multiplex valve 32 will be in the pressure set position and the passage 128 will be communicated with the backfill passage 132 while the passage 130 will be communicated with the passage 126 which is the outlet pressure from the trim valve 76. Thus, when the solenoid valve 66 is ON and the trim valve 76 is controlled to provide a pressure output, the torque-transmitting device C5 is engaged. If the solenoid valve 66 is OFF and the valve 32 is in the spring set position, fluid pressure in the passage 126 passes through the multiplex valve 32 to the passage 128 and if the default valve 100 is in the pressure set position, the output pressure from the trim valve 76 can be controlled to establish the engagement of the torque-transmitting device C2.

It should also be noted that when the default valve 100 has been placed in the pressure set position, a latching pressure in passage 124 will operate on the differential area 125 formed on the default valve 100 to hold the default valve 100 in the pressure set position as long as the manual valve 30 remains in the drive or neutral position and the multiplex valve is in the spring set position. If the manual valve 30 is moved to the reverse position, the latching pressure will be overcome by fluid pressure in the spring chamber 98 of the default valve 100 which cooperates with the spring 99 thereby forcing the default valve 100 to the spring set position regardless of the bias pressures on either the differential area 125 and/or the pressure balance chamber 137 connected with the passage 136. The trim valve 84 controls the engagement pressure for the torque-transmitting device C4.

As seen in FIG. 3, when the manual valve 30 is in the neutral condition and electrical power is available, the solenoid valve 66 is energized thereby placing the multiplex valve 32 in the pressure set position such that fluid pressure in the main passage 26 is directed through the multiplex valve 32 to the trim valve 76 which is actuated by the solenoid valve 56 to issue engagement pressure to the passage 126 which is directed through the multiplex valve 32 to the torque transmitting device C5. Thus, when electrical power is available and the manual valve is in neutral, the torque-transmitting device C5 is engaged.

If, however, no electrical power is available to the transmission and the manual valve is in neutral, the hydraulic valves of the control will assume the positions shown FIG. 4. With this situation, the pressure in passage 26 is distributed through the multiplex valve 32 but is blocked at the default valve 100 which is in the spring set position. It should be noted that the trim valves 72 and 76 are in the fully pressurized position since the solenoids 54 and 56 are normally open valves and therefore full control pressure is available at the trim valves 72 and 76. The solenoid valve 62 is also a normally open control valve such that the bias pressure is available at the main regulator valve 28 thereby boosting the pressure value within the passage 26 and also causing the trim valves to be conditioned for the high gain position by controlling the position of a control valve 148 which controls the pressure in a passage 146. The pressure in the passage 146 controls the gain of the trim valves 72, 76, and 80 in accordance with the teaching of U.S. Pat. No. 5,911,244.

When the electrical power is available and the manual valve 30 is set to the reverse position, as shown in FIG. 3, the pressure in passage 26 is distributed through the manual valve to the reverse passage 92 which passes through the shuttle valve 102 to place the multiplex valve 32 in the pressure set position and through the shuttle valves 104 and 112 to provide pressure at the inlet passage 118 of the trim valve 72. Also the pressurized fluid in the passage 92 is directed to the spring chamber 98 to ensure that the default valve is in the spring set position. Also when the manual valve 30 is in the reverse position, the trim valve 76 provides engagement pressure to the torque-transmitting device C5 through the passage 126 and the multiplex valve 32. The trim valve 72 is open to provide fluid pressure for the engagement of the torque-transmitting device C3, thus reverse drive is established.

For first range, the manual valve is placed in the drive position. The solenoid valve 58 controls the output pressure of the trim valve 80 which is directed through the passage 138 to the default valve 100. The default valve 100 is placed in the pressure set position by fluid pressure in the passage 136 as controlled by the trim valve 80. The pressure in the passage 140, which is communicated through the default valve 100 with the passage 138, will cause the exhaust check valve 142 to move against its control spring thereby permitting engagement pressure to be established at the torque transmitting device C1. The solenoid valve 66 has been actuated which places the multiplex valve 32 in the pressure set position. This is to permit the engagement of the torque-transmitting device C5. During the first forward range, the pressure in the torque transmitting device C5 is established by the trim valve 76 acting through the multiplex valve 32.

The position of the valves shown in FIG. 5 represents the control in the second forward speed ratio with electrical power available. The manual valve 30 distributes pressure from passage 26 to the forward passage 94 which is directed to the inlets of the trim valves 80 and 84. The trim valve 84 is controlled by the solenoid valve 60 which thereby controls the engagement of the torque-transmitting device C4. When electrical power is available, an upshift or ratio interchange from second to third in the forward ranges is permitted by controlling the torque transmitting device C4 to an OFF position while controlling the torque transmitting device C3 to an engaged position. The torque-transmitting device C3 is controlled by the solenoid valve 54 and the trim valve 72. The torque-transmitting device C1 is engaged by fluid pressure controlled at the output of the trim valve 80. A down shift to first is attained by reducing the pressure at the torque transmitting device C4 (trim valve 84) while increasing the pressure at the torque transmitting device C5 (trim valve 76).

Figure 6:
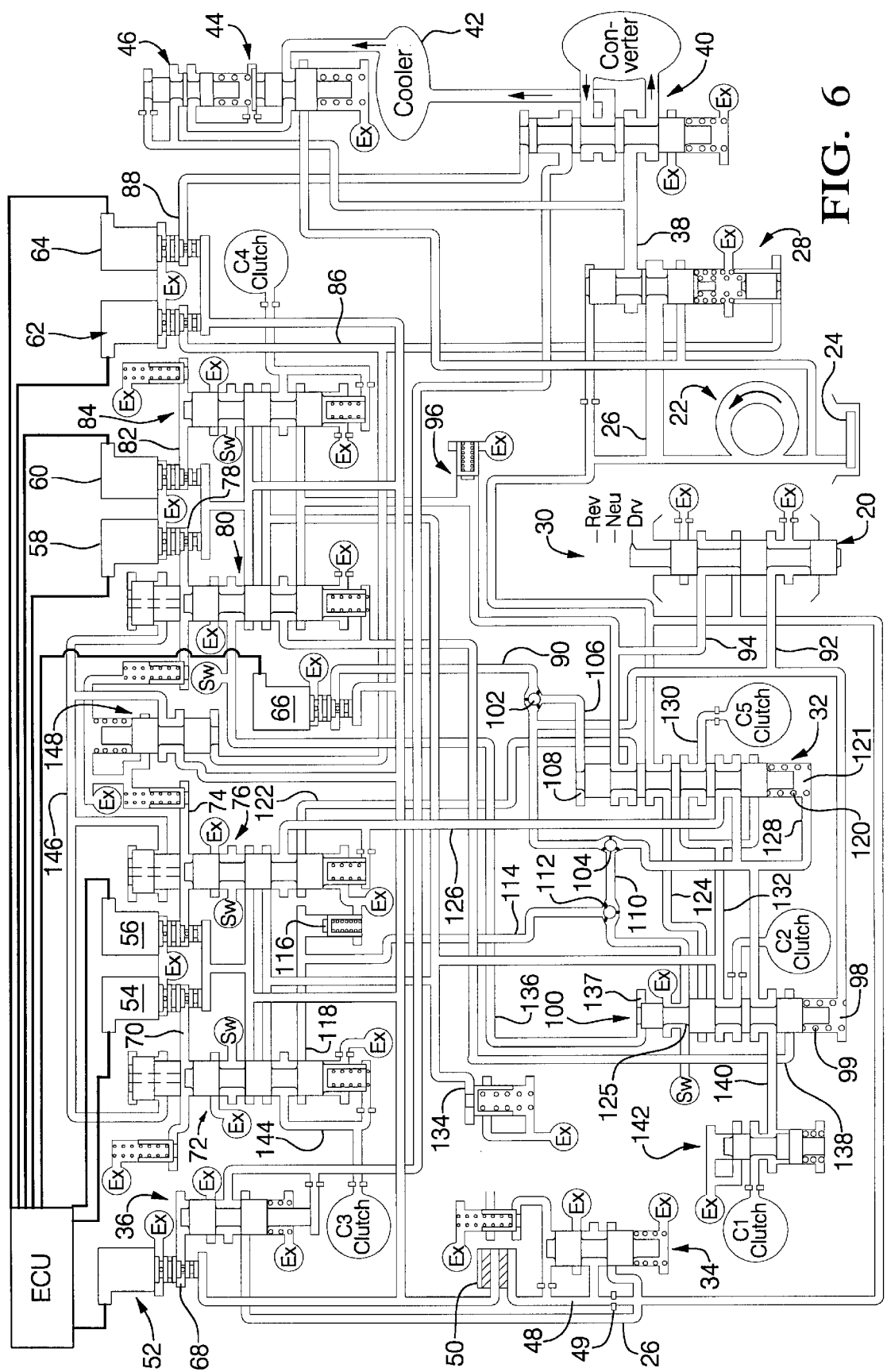
FIG. 6 is a schematic representation similar to FIG. 2, depicting the control system in the third forward range with the electrical power OFF.

However, if the electrical power should be discontinued and the transmission is operating in either the first or second forward speed, the position of the valves shown in FIG. 6 will be assumed. In this position both the multiplex valve 32 and the default valve 100 are in their spring set positions such that fluid pressure in passage 26 is directed to the manual valve 30 through the forward passage 94 and through the multiplex valve 32 to the passage 122 which is the inlet for the trim valve 76. Note, the pressure bias in passage 90 and 136 are discontinued when the electrical power is discontinued. The fluid in passage 26 is also directed from the trim valve 76 through passage 126, the multiplex valve 32, passage 128 and shuttle valves 104 and 112 to the passage 118 which is the inlet passage for the trim valve 72. Note that the fluid pressure in the passage 128 will enforce the spring set position of the multiplex valve 32. The fluid pressure in passage 128 is also directed through the default valve 100 to the torque-transmitting device C1. The fluid pressure at the trim valve 72 is directed to the torque-transmitting device C3. Thus, the third forward speed range is established whenever the electrical power is disconnected and the transmission is operating in the first range or second range. The third speed range is also actuated when the electrical power is not available and the manual valve has been moved from the neutral position to the reverse position and then to the drive position. It should be appreciated that the trim valve 76 provides the pressure to the torque transmitting device C1 when the electrical power is discontinued. The trim valve 76 provides engagement pressure for both of the torque transmitting devices C5 and C2, during normal operation, and to C1 during electrical power discontinuance.

Figure 7:
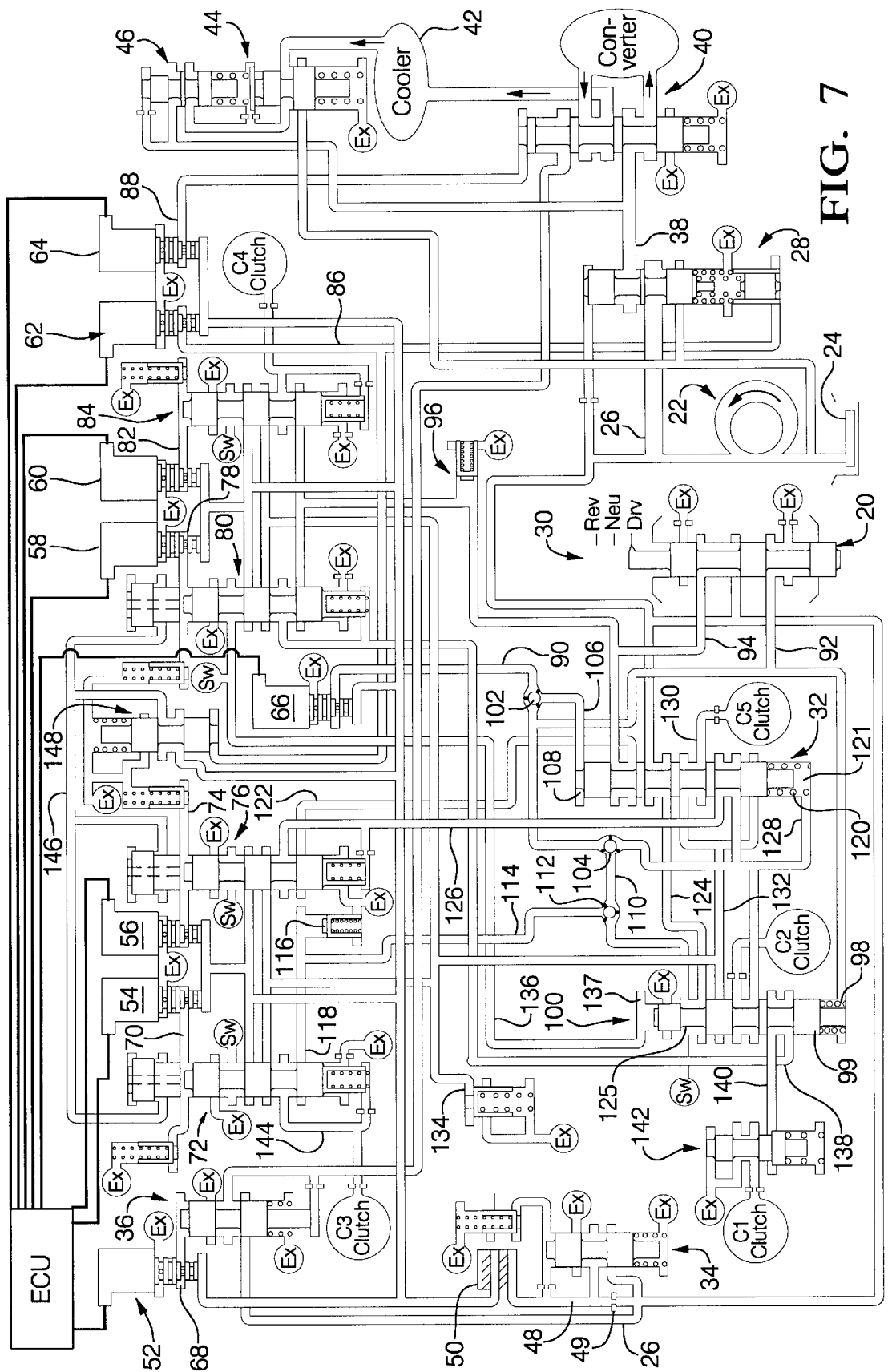

The valve position shown in FIG. 7 represents the sixth forward speed ratio with electrical power available. In this position, the multiplex valve 32 is held upward in the spring set position by fluid pressure in the chamber 121 and the default valve 100 is maintained downward by the latch pressure in the passage 124 acting on the differential bias area 125. The default valve 100 is placed in the downward position by pressure in the passage 136 which is controlled by the trim valve 80 during engagement of the lower forward speed ratios. The torque transmitting device C4 is controlled in engagement by the trim valve 84 and the torque transmitting device C2 is controlled in engagement by pressure from the trim valve 76 being directed through the multiplex valve 32 and the default valve 100.

If the vehicle is operating in sixth range and the electrical power should be discontinued, the solenoid valve 60 will close and the trim valve 84 will disengage or exhaust the torque-transmitting device C4. However, when the electrical power is discontinued, both of the trim valves 72 and 76 will provide full output pressure as shown in FIG. 8.

Figure 8:
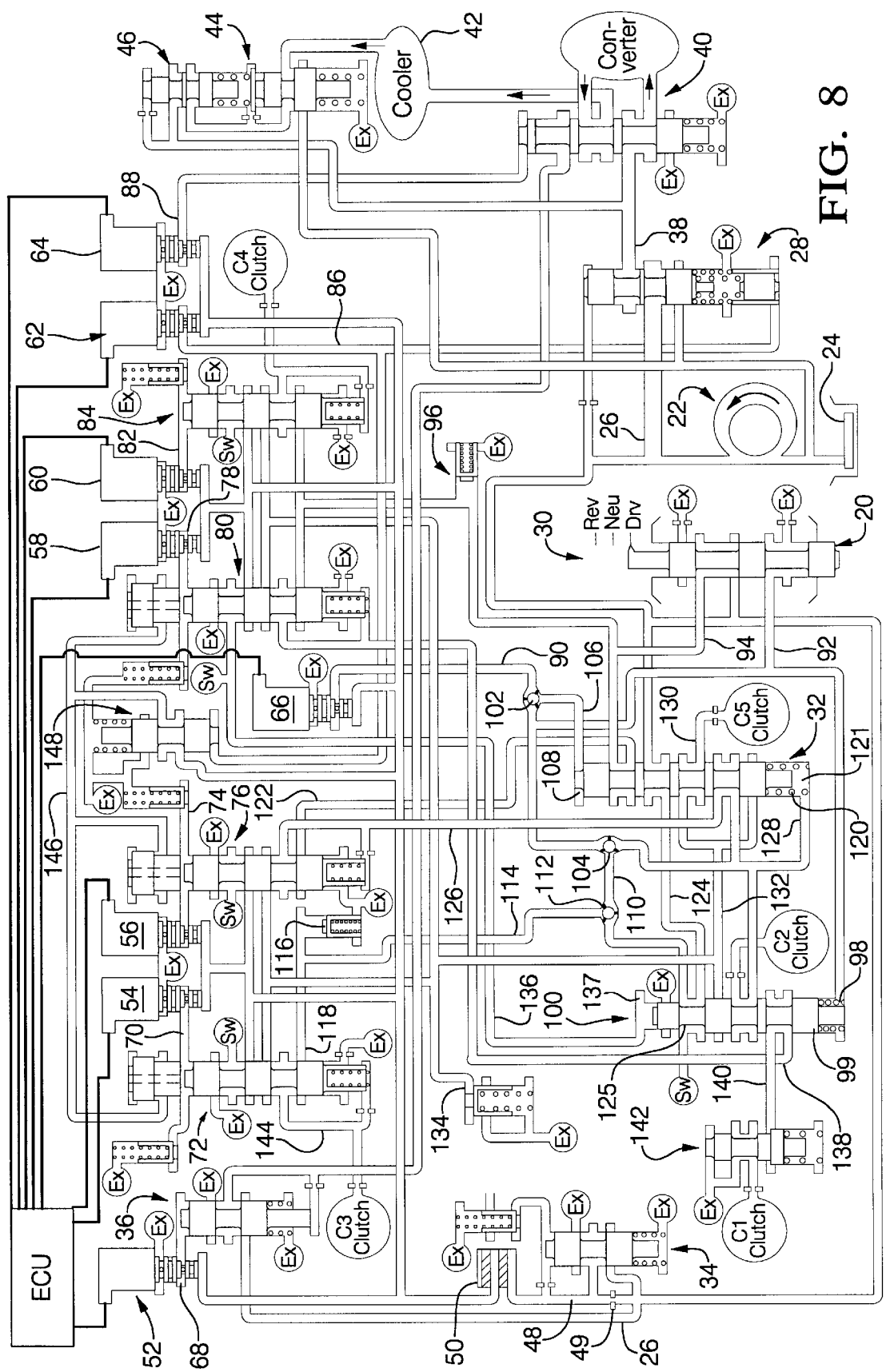
FIG. 8 is a schematic representation depicting the control system in the fifth forward range with the electrical power OFF.

As seen in FIG. 8, the transmission control mechanism is conditioned to engage the fifth forward speed range. That is, the torque transmitting device C3 is controlled in engagement through the trim valve 72 and the torque transmitting device C2 is controlled from the manual valve 30 through the multiplex valve 32, the trim valve 76, back through the multiplex valve 32, and then through the default valve 100. Note that the default valve 100 has been latched in the pressure set position by fluid pressure in the passage acting on the differential area 125 of the default valve 100. This pressure is directed to the default valve 100 through the multiplex valve 32 which connects passages 26 and 124.

In the event of an electrical power discontinuance when the transmission is operating in the third, fourth, fifth, or sixth range, the control 20 will default to the fifth range and remain in this range until the manual valve 30 is shifted to reverse and back to forward as long as the engine is operating. After this maneuver, the transmission will operate in the third forward range when the manual valve 30 is in the forward position. When the transmission is operating in the third range and an electrical power discontinuance occurs, the default valve 100 is held in the pressure set position by the pressure in passages 26 and 124 operating on the differential area 125 and the pressure from the trim valve 80 is discontinued. The trim valve 72 remains open and causes engagement of the torque transmitting device C3. The pressure in passage 126, from the trim valve 76, is set at the maximum value and distributed through the multiplex valve 32 and passage 128 to the default valve 100 and the torque transmitting device C2 to establish the fifth forward speed ratio.

The control system provides for automatic ratio interchanges among the first six ranges. To establish the first and lowest forward speed range, the default valve 100 is in the pressure set position from pressure fluid distributed by the solenoid valve 58. The multiplex valve 32 is in the pressure set position by oil distributed from the C2/C5 on/off solenoid valve 66. The torque-transmitting device C1 is pressurized through the default valve 100 by pressure control at the trim valve 80. The torque-transmitting device C5 is controlled by fluid pressure distributed through the multiplex valve from the C2/C5 trim valve 76. The torque-transmitting device C5 is, of course, engaged in neutral such that a neutral or first shift only requires the engagement of the torque-transmitting device C1 under normal operating conditions.

The second forward range is established from the first forward range by decreasing the pressure in the torque-transmitting device C5 while increasing the pressure in the torque-transmitting device C4. During the second forward range of operation, the default valve 100 is in the pressure set position by hydraulic fluid from the solenoid valve 58. The multiplex valve 32 is in the pressure set position by oil distributed from the on/off solenoid valve 66. The torque-transmitting device C1 remains engaged by pressure distributed from the trim valve 80. The torque-transmitting device C4 is controlled in engagement by pressure distributed from the trim valve 84.

The third forward speed range is controlled by the torque-transmitting devices C1 and C3. The default valve 100 is maintained in the pressure set position by fluid pressure from the solenoid valve 58. The multiplex valve 32 is moved to the spring set position by the on/off solenoid valve 66 being moved to the off position. The torque-transmitting device C1 continues to be supplied with hydraulic fluid from the trim valve 80. The torque-transmitting device C3 is controlled in engagement by fluid distributed through both the multiplex valve 32 and the default valve 100 to the trim valve 72. The trim valve 72 is then controlled to engage the torque-transmitting device C3 while the trim valve 84 is controlled to reduce the pressure in the torque-transmitting device C4.

The fourth forward speed range is controlled in an upshift from the third speed range by disengaging the torque-transmitting device C3 while engaging the torque-transmitting device C2. In the fourth forward speed range, the default valve 100 is disposed in the pressure set position by fluid pressure from the solenoid valve 58 and the multiplex valve 32 remains in the spring set position. The torque-transmitting device C1 remains engaged by fluid pressure distributed from the trim valve 80. The torque-transmitting device C2 is controlled in engagement by fluid pressure from the trim valve 76, which flows through the multiplex valve 32, and the default valve 100.

The fifth forward speed range is established by exhausting or disengaging the torque-transmitting device C1 while engaging the torque-transmitting device C3. During the fifth forward speed range, the default valve 100 remains in the pressure set position, due to latch 125 via pressure from passage 124 through multiplex valve 32 to passage 26, and the multiplex valve is in the spring set position. The torque-transmitting device C2 remains engaged by fluid pressure distributed from the trim valve 76 through both the multiplex valve 32 and the default valve 100. The torque-transmitting device C3 is engaged in a controlled manner by fluid pressure distributed from the trim valve 72. Trim valve 72 is supplied with hydraulic fluid from the pressure source through the multiplex valve 32 and the default valve 100.

The sixth forward speed range is established by disengaging the torque-transmitting device C3 while engaging the torque transmitting-device C4. In the sixth forward speed range, the default valve 100 is in the pressure set position, as explained above, and the multiplex valve is in the spring set position, as explained above. The torque-transmitting device C2 remains engaged by fluid pressure distributed from the trim valve 76 which is supplied with hydraulic fluid from the multiplex valve 32 and the default valve 100. The torque-transmitting device C4 is engaged in a controlled manner by hydraulic pressure distributed from the trim valve 84 which receives oil through the manual valve in passage 94.

Thus, the transmission during normal operation provides for controlled single step ratio interchanges in both an upshifting direction and in a downshifting direction when the electrical power is available to the electronic control unit which provides the proper control signals to enforce the above torque transmitting device engagement and disengagement. Those skilled in the art will also recognize that the control described above will permit skip shifting or double step ratio interchanges in the forward direction. A first to third interchange is available by operating the trim valves 76 and 72 to disengage C5 and engage C3. A second to fourth interchange is available by operating the trim valves 84 and 76 to disengage C4 and engage C2. During this interchange, the solenoid 66 is turned off so that the multiplex valve 32 will assume the spring set position. A third to fifth interchange is accomplished by operating the trim valves 80 and 74 to disengage C1 and engage C2. A fourth to sixth interchange is accomplished by operating the trim valves 80 and 84 to disengage C1 and engage C4.

What is claimed is:

1. An electro-hydraulic control mechanism for a power transmission having a plurality of torque transmitting devices selectively engageable by said control mechanism to provide six forward speed ratios, a neutral condition, and a reverse speed ratio, said electro-hydraulic control mechanism comprising:

a main source of hydraulic fluid pressure;

an electrical source of electrical control signals;

a plurality of solenoid valves that are selectively operable in response to signals from said electrical source, at least two of said solenoids being normally open during a discontinuance of electrical control signals;

a first trim valve selectively connectable with said main source and being operable in response to one of said two normally open solenoid valves to output an engagement control pressure;

a second trim valve selectively connectable with said main source operable in response to another of said two normally open solenoid valves to output an engagement control pressure;

a multiplex valve disposed in fluid communication with said main source and being connected to receive selective hydraulic fluid communication from said second trim valve;

a default valve disposed in downstream flow relation with said multiplex valve and being connected to receive selective hydraulic fluid distribution from said multiplex valve;

a manual valve having selective forward, neutral and reverse positions and being disposed in hydraulic fluid flow relation between said hydraulic source and said multiplex valve to selectively distribute hydraulic fluid to said first trim valve, said default valve, and said multiplex valve when said reverse position is selected, and to selectively distribute hydraulic fluid to said multiplex valve when said forward position is selected; and said first trim valve distributing hydraulic fluid to a first of the torque transmitting devices when said electrical source is inoperable and the manual valve is in the forward or reverse position, said second trim valve distributing hydraulic fluid to said multiplex valve for distribution to a second of said torque transmitting devices when said electrical source is inoperable and said manual valve is in said reverse position, and said second trim valve, said multiplex valve, and said default valve cooperating to distribute hydraulic fluid from said manual valve to a third of said torque transmitting devices when said electrical source is inoperative and said manual valve is in said forward position.

2. An electro-hydraulic control mechanism for a power transmission having a plurality of torque transmitting devices selectively engageable by said control mechanism to provide six forward speed ratios including two lower speed ratios and four higher speed ratios, a neutral condition, and a reverse speed ratio, said electro-hydraulic control mechanism comprising:

a main source of hydraulic fluid pressure;

an electrical source of electrical control signals;

a plurality of solenoid valves that are selectively operable in response to signals from said electrical source, at least two of said solenoids being normally open during a discontinuance of electrical control signals;

a first trim valve selectively connectable with said main source and being operable in response to one of said two normally open solenoid valves to output an engagement control pressure;

a second trim valve selectively connectable with said main source operable in response to another of said two normally open solenoid valves to output an engagement control pressure;

a multiplex valve disposed in fluid communication with said main source and being connected to receive selective hydraulic fluid communication from said second trim valve;

a default valve disposed in downstream flow relation with said multiplex valve and being connected to receive selective hydraulic fluid distribution from said multiplex valve;

a manual valve having selective forward, neutral and reverse positions and being disposed in hydraulic fluid flow relation between said hydraulic source and said multiplex valve to selectively distribute hydraulic fluid to said first trim valve, said default valve, and said multiplex valve when said reverse position is selected, and to selectively distribute hydraulic fluid to said multiplex valve when said forward position is selected; and said first trim valve distributing hydraulic fluid to a first of the torque transmitting devices when said electrical source is inoperable and the manual valve is in the forward or reverse position, said second trim valve distributing hydraulic fluid to said multiplex valve for distribution to a second of said torque transmitting devices when said electrical source is inoperable and said manual valve is in said reverse position, and said second trim valve, said multiplex valve, and said default valve cooperating to distribute hydraulic fluid from said manual valve to a third of said torque transmitting devices when said electrical source is inoperative, said manual valve is in said forward position, said main source is supplying hydraulic fluid, and said transmission is operating in one of said four higher forward speed ratios prior to said electrical source becoming inoperable.

3. The electro-hydraulic control mechanism defined in claim 2 further comprising:

said manual valve, said multiplex valve, said default valve, and said second trim valve cooperating to direct hydraulic fluid from said main source to a fourth of said torque transmitting devices when said transmission is operating in one of said lower forward speed ratios, said main source is supplying hydraulic fluid, said electrical source becomes inoperable, and said manual valve is in said forward position.

4. An electro-hydraulic control mechanism for a power transmission having a plurality of torque transmitting devices selectively engageable by said control mechanism to provide six forward speed ratios including two lower speed ratios and four higher speed ratios, a neutral condition, and a reverse speed ratio, said electro-hydraulic control mechanism comprising:

a main source of hydraulic fluid pressure;

an electrical source of electrical control signals;

a plurality of solenoid valves that are selectively operable in response to signals from said electrical source, at least two of said solenoids being normally open during a discontinuance of electrical control signals;

a first trim valve selectively connectable with said main source and being operable in response to one of said two normally open solenoid valves to output an engagement control pressure;

a second trim valve selectively connectable with said main source operable in response to another of said two normally open solenoid valves to output an engagement control pressure;

a multiplex valve disposed in fluid communication with said main source and being connected to receive selective hydraulic fluid communication from said second trim valve, said multiplex valve having a spring set position and a pressure set position;

a default valve disposed in downstream flow relation with said multiplex valve and being connected to receive selective hydraulic fluid distribution from said multiplex valve, said default valve having a spring set position and a pressure set position;

a manual valve having selective forward, neutral and reverse positions and being disposed in hydraulic fluid flow relation between said hydraulic source and said multiplex valve to selectively distribute hydraulic fluid to said first trim valve, said default valve, and said multiplex valve when said reverse position is selected, and to selectively distribute hydraulic fluid to said multiplex valve when said forward position is selected; and said first trim valve distributing hydraulic fluid to a first of the torque transmitting devices when said electrical source is inoperable and the manual valve is in the forward or reverse position, said second trim valve distributing hydraulic fluid to said multiplex valve in said pressure set position for distribution to a second of said torque transmitting devices when said electrical source is inoperable and said manual valve is in said reverse position, and said second trim valve, said multiplex valve in said spring set position, and said default valve in said pressure set position cooperating to distribute hydraulic fluid from said manual valve to a third of said torque transmitting devices when said electrical source is inoperative, said manual valve is in said forward position, said main source is supplying hydraulic fluid, and said transmission is operating in one of said four higher forward speed ratios prior to said electrical source becoming inoperable.

5. The electro-hydraulic control mechanism defined in claim 4 further comprising:

said default valve moving from said pressure set position to said spring set position when said manual valve is moved from said forward position to said reverse or neutral position when said electrical source is inoperable and said manual valve, said multiplex valve, said default valve, and said second trim valve cooperating to direct hydraulic fluid from said main source to a fourth of said torque transmitting devices when said manual valve is moved from said reverse position or said neutral position to said forward position.

* * * * *